May 16, 1961  H. LENTZ  2,984,130
CUTTING TOOL AND MEANS FOR POSITIONING THE LATTER
Filed July 8, 1959
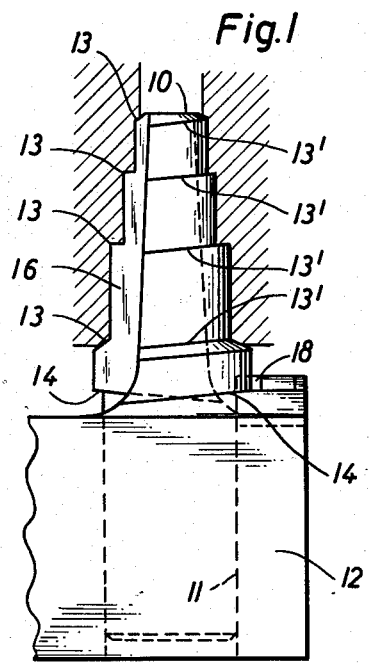
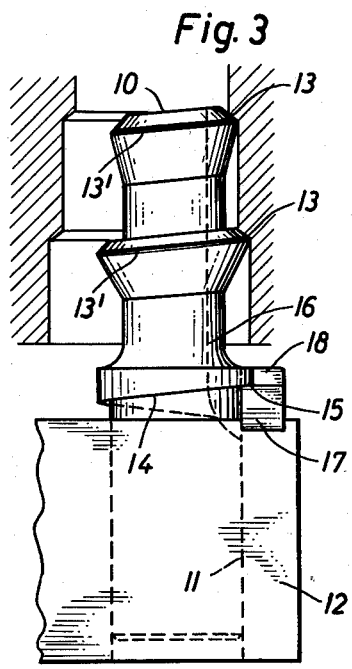
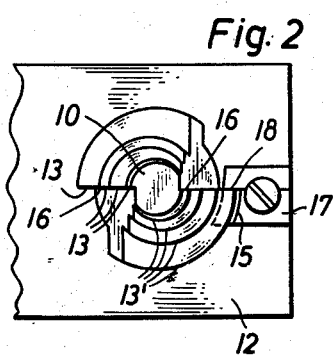
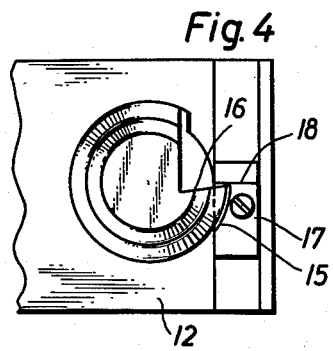
INVENTOR
Hermann Lentz
BY
Richard S. Striker
Attorney

United States Patent Office 2,984,130
Patented May 16, 1961

2,984,130

CUTTING TOOL AND MEANS FOR POSITIONING THE LATTER

Hermann Lentz, Koln-Hohenhaus, Germany, assignor to Alfred H. Schutte, Koln-Deutz, Germany Filed July 8, 1959, Ser. No. 825,706

Claims priority, application Germany July 11, 1958

4 Claims. (Cl. 77—58)

The present invention relates to cutting tools.

More particularly, the present invention relates to cutting tools capable of being used, for example, for boring openings in a workpiece. It often happens that a cutting tool cannot be used continuously from the beginning to the end of a given operation. Often it is necessary to remove the cutting tool so that it can be sharpened and then replaced in the machine tool so as to continue the operation. The sharpening of a cutting tool under these circumstances results in a change of the position of the cutting edge as well as a change in the length of the cutting tool, and therefore it becomes necessary to accurately position the cutting tool both angularly and axially, and this proper positioning of the sharpened tool requires the use of special gauges and is an extremely tedious, time consuming operation.

It is an object of the present invention to overcome the above drawbacks by providing a cutting tool and a structure used therewith which will enable the cutting tool after it is sharpened to be very accurately positioned both axially and angularly without requiring the use of any special gauges or the like and in a minimum of time with a minimum amount of care on the part of the operator.

It is also an object of the present invention to provide a structure which is applicable to many different types of cutting tools to enable them to be accurately positioned after sharpening.

With the above objects in view the invention includes a cutting tool which has an elongated cutting section and an elongated holding section extending axially from the cutting section, this holding section being adapted to be gripped in a suitable tool holder. The cutting section of the tool has an elongated cutting edge extending along the axis of the tool and a plurality of stepped portions which extend helically from the cutting edge around the axis of the tool, all of these stepped portions having the same lead. In accordance with the present invention this cutting tool has a helical stop surface extending around the axis of the tool and having the same lead as the stepped portions of the cutting section, so that this helical stop surface will be able to cooperate with a suitable stop member also constructed in accordance with the present invention for accurately positioning the tool after it is sharpened both axially and angularly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevation of a cutting tool assembly according to the present invention, Fig. 1 showing the tool diagrammatically in a workpiece;

Fig. 2 is a top plan view of the structure of Fig. 1;

Fig. 3 is an elevation of another embodiment of a cutting tool to which the invention is applied; and Fig. 4 is a top plan view of the structure of Fig. 3.

Referring to Fig. 1, it will be seen that the cutting tool illustrated therein includes an elongated cutting section 10 and an elongated holding section 11 extending axially from the cutting section 10, these sections being coaxial and the holding section 11 being cylindrical and being received removably in a cylindrical bore of a suitable tool holder 12 to which the section 11 can be clamped in any axial and angular position in a well known manner.

In the example illustrated in Figs. 1 and 2, the elongated cutting section 10 is provided with a pair of cutting edges 13 each of which extends along the axis of the tool as illustrated. In addition, the cutting section 10 of the tool is provided with a plurality of stepped portions 13' extending helically around the axis of the tool from each of the cutting edges 13. It will be noted that all of the stepped portions 13' have the same lead.

In accordance with the present invention the cutting tool is provided with a stop surface 14 which also extends helically around the axis of the tool, and this stop surface in the case of a tool provided with a pair of cutting edges 13 as illustrated in Fig. 1 has a pair of portions respectively extending from the two cutting edges. In accordance with the invention the stop surface 14 has the same lead as the stepped portions 13'.

The tool holder 12 carries a stop member 17 provided with a helical surface portion 15 of the same slope as the surface 14 and adapted to be engaged by one of the surfaces 14 in the embodiment of Figs. 1 and 2 for axially positioning the cutting tool. The stop member 17 additionally has a stop surface 18 located on a portion of the stop member 17 which extends angularly up from the part of the stop member 17 provided with the surface 15, as viewed in Fig. 1. The stop surface 18 is located in a vertical plane, as viewed in Fig. 1, which is parallel to the axis of the cutting tool. It will be noted that the cutting tool is provided with elongated surfaces 16 which respectively terminate at their outer limits in the cutting edges 13, and it is these surfaces 16 which are ground in order to sharpen the cutting edges 13. When the cutting tool 10, 11 is positioned on the holder 12, one of the stop surfaces 14 is placed in engagement with the helical surface 15 of the stop member 17 which is removably fixed to the holder 12 by the screw shown in Fig. 2, and then the cutting tool is turned until one of its surfaces 16 engages the stop surface 18, or until one of its cutting edges 13 engages the stop surface 18. Thus, the engagement of a cutting edge or surface 16 with the stop surface 18 determines the angular position of the tool while the engagement of a stop surface 14 with the surface 15 of the stop member 17 determines the axial position of the tool, and in this way even after the tool is sharpened it will be accurately positioned both axially and angularly after sharpening in such a way that the sharpened cutting edge has precisely the same angular and axial position as the cutting edge of the tool just prior to removal of the latter from the holder 12 for sharpening. As is apparent from Fig. 1, the tool illustrated will cut a stepped bore in a workpiece.

The tool of Figs. 3 and 4 is adapted to increase the diameter of a bore which is already formed in a workpiece. Thus, it will be noted from Fig. 3 that the axis of the tool is spaced from and parallel to the axis of the bore which is being cut by the tool. In the embodiment of Figs. 3 and 4 the tool also has an elongated cutting section 10 and an elongated holding section 11 held by the tool holder 12 in a well known manner. The cutting section 10 in this embodiment has only a single elongated cutting edge 13 extending along the axis of the tool and forming the outer limit of the surface 16. The cutting section 10 also has the stepped portions 13' extending helically from the cutting edge 13 around the axis of the tool and having the same lead. Furthermore, the tool has a stop surface 14 of the same lead as the stepped portion 13' extending around the axis of the tool at the junction between the cutting section 10 and holding section 11 thereof, and in the embodiment of Figs. 3 and 4 since there is but a single cutting edge there is but a single stop surface 14. The tool holder 12 of Figs. 3 and 4 also removably carries a stop member 17 provided with a helical surface 15 of the same slope as and engaged by the helical stop surface 14 for axially positioning the tool after sharpening thereof. In addition, the stop member 17 also has the surface 18 which forms part of a portion of stop member 17 extending angularly from the portion provided with the helical surface 15, and the stop member 17 is removably fixed to the holder 12 in any suitable way as by the screw which is visible in Fig. 4. As is apparent from the drawings, after the tool is sharpened at its surface 16 it will again be accurately positioned by engagement of the surface 14 with the surface 15 and engagement of the edge 13 with the surface 18. The latter surface will provide the same angular position of the cutting edge while the surface 14 cooperates with the surface 15 to provide the same axial position of the cutting edge. It should be noted that the positioning of the cutting edge 13 angularly by the stop surface 18 is of particular significance with a tool having a single cutting edge as shown in Figs. 3 and 4, since this determines the radial distance of the cutting edge from the axis of the bore which is being cut. When a stepped bore is being formed by a tool as illustrated in Figs. 1 and 2 then of course the tool more or less centers itself in the bore, but with the embodiment of Figs. 3 and 4 the stop surface 18 will accurately locate the cutting edge at the same radial distance from the axis of the bore as the distance which this cutting edge had before it was removed for sharpening. Of course, with the embodiment of Figs. 1 and 2 only a single stop surface 14 cooperates with the surface 15 of the stop 17.

Thus, it will be seen that with the structure of the invention the tool can be very accurately positioned quickly and simply without the use of any special feeler gauges or the like. Moreover, since the stops 17 are removably connected with the tool holder 12, it is possible to exchange a stop of one configuration for a stop of another configuration when working with a different tool or performing a different operation.

Although the stop surface 14 is located in the above-described examples of tools constructed in accordance with the present invention at the junction between the cutting section 10 and holding section 11, this stop surface 14 may also be located at any other convenient location along the tool. Thus, the stop surface 14 may be located at an end of the tool rather than intermediate its ends or it may be located approximately midway between the ends of the tool in a suitable groove or the like. Also, it is possible to provide the tool with a sleeve which has on it the stop surface 14 and also instead of providing the stop 17 on the tool holder and the stop surface 14 on the tool these may be reversed and the stop surface 14 may be located on a suitable member carried by the holder and the stop 17 may be carried by the tool itself. Also, the invention is not limited to tools having axially displaced stepped portions and may also be used with tools which have angularly displaced stepped portions.

It will be understood that each of the elements described above, or two or more together, may also find a useful application in other types of tools differing from the types described above.

While the invention has been illustrated and described as embodied in cutting tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cutting tool assembly, in combination, a tool holder; a cutting tool carried by said tool holder and having an elongated cutting section extending beyond the tool holder and an elongated holding section connected with the tool holder, said cutting section having an elongated cutting edge extending along the axis of the tool and at least one stepped portion extending helically from the cutting edge around the axis of the tool and having a predetermined lead, said cutting tool also having a helical stop surface extending around the axis of the tool and having the same lead as said stepped portion; and a stop carried by said tool holder and engaging said stop surface of said cutting tool, said stop having a first surface of the same slope as and engaged by said stop surface and a second surface engaged by the cutting edge of the cutting tool so that said second surface determines the angular position of the cutting tool while the first surface of the stop determines the axial position of the cutting tool.

2. In a cutting tool assembly, in combination, a tool holder; a cutting tool carried by said tool holder and having an elongated cutting section extending beyond the tool holder and an elongated holding section connected with the tool holder, said cutting section having an elongated cutting edge extending along the axis of the tool and a plurality of stepped portions extending helically from the cutting edge around the axis of the tool and all having the same predetermined lead, said cutting tool also having a helical stop surface extending around the axis af the tool and having the same lead as said stepped portions; and a stop carried by said tool holder and engaging said stop surface of said cutting tool, said stop having a first surface of the same slope as and engaged by said stop surface and a second surface engaged by the cutting edge of the cutting tool so that said second surface determines the angular position of the cutting tool while the first surface of the stop determines the axial position of the cutting tool, said second surface of said stop extending at an angle from the first surface of said stop.

3. In a cutting tool assembly, in combination, a tool holder; a cutting tool carried by said tool holder and having an elongated cutting section extending beyond the tool holder and an elongated holding section connected with the toolholder, said cutting section having an elongated cutting edge extending along the axis of the tool and a plurality of stepped portions extending helically from the cutting edge around the axis of the tool and all having the same predetermined lead, said cutting tool also having a helical stop surface extending around the axis of the tool and having the same lead as said stepped portions; a stop carried by said tool holder and engaging said stop surface of said cutting tool, said stop having a first surface of the same slope as and engaged by said stop surface and a second surface engaged by the cutting edge of the cutting tool so that said second surface determines the angular position of the cutting tool while the first surface of the stop determines the axial position of the cutting tool; and means for removably connecting said stop to said tool holder.

4. In a cutting tool assembly, in combination, a tool holder; a cutting tool carried by said tool holder and having an elongated cutting section extending beyond the tool holder and an elongated holding section connected with the tool holder, said cutting section having an elongated cutting edge extending along the axis of the tool and at least one stepped portion extending helically from the cutting edge around the axis of the tool and having a predetermined lead, said cutting tool also having a helical stop surface extending around the axis of the tool and having the same lead as said stepped portion; and a stop carried by said tool holder and engaging the stop surface of said cutting tool, said stop having a surface of the same slope as and engaged by said stop surface so that the surface of said stop determines the axial position of the cutting tool.

References Cited in the file of this patent

UNITED STATES PATENTS

| | | |
|---|---|---|
| 2,207,542 | Hedin | July 6, 1940 |
| 2,430,263 | West | Nov. 4, 1947 |

FOREIGN PATENTS

| | | |
|---|---|---|
| 488,929 | France | Aug. 3, 1918 |